United States Patent
Yamamoto (10) Patent No.: US 11,724,333 B2
(45) Date of Patent: Aug. 15, 2023

(54) MANUFACTURING METHOD OF SECONDARY BATTERY AND SECONDARY BATTERY

(71) Applicant: TOYOTA JIDOSHA KABUSHIKI KAISHA, Toyota (JP)

(72) Inventor: Satomi Yamamoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 390 days.

(21) Appl. No.: 16/855,116

(22) Filed: Apr. 22, 2020

(65) Prior Publication Data
US 2020/0343518 A1 Oct. 29, 2020

(30) Foreign Application Priority Data

Apr. 23, 2019 (JP) .................................. 2019-081817

(51) Int. Cl.
*B23K 20/10* (2006.01)
*H01M 10/0525* (2010.01)
(Continued)

(52) U.S. Cl.
CPC ......... *B23K 20/10* (2013.01); *H01M 10/0409* (2013.01); *H01M 10/0525* (2013.01);
(Continued)

(58) Field of Classification Search
CPC ............. H01M 50/531; H01M 50/557; H01M 10/0409; H01M 10/0525; B23K 20/10; B23K 2101/38
See application file for complete search history.

(56) References Cited

U.S. PATENT DOCUMENTS

2006/0169388 A1  8/2006  Shimizu et al.
2010/0203371 A1  8/2010  Nagai et al.
(Continued)

FOREIGN PATENT DOCUMENTS

CN       107851768 A    3/2018
JP       63-40252 A     2/1988
(Continued)

OTHER PUBLICATIONS

JP-2014179435-A Ando machine translation (Year: 2014).*
(Continued)

*Primary Examiner* — William E McClain
*Assistant Examiner* — Kirsten B Tysl
(74) *Attorney, Agent, or Firm* — Sughrue Mion, PLLC (57) ABSTRACT

According to the present disclosure, the breakage of an exterior body due to rising deformation of an electrode terminal can be prevented. The manufacturing method herein disclosed includes the steps of: bringing a lower surface of a terminal connecting part into contact with a first terminal, and bringing an upper surface of the terminal connecting part into contact with a second terminal; interposing the terminal connecting part, the first terminal, and the second terminal between a horn and an anvil, and carrying out ultrasonic welding; and accommodating the electrode body into the exterior body. Such a manufacturing method is characterized in that a width dimension of the horn is longer than a width dimension of the second terminal, and a width dimension of the anvil is longer than the width dimension of the second terminal. This can prevent rising deformation of the electrode terminal, and can prevent breakage of the exterior body by the deformed electrode terminal.

5 Claims, 5 Drawing Sheets

(51) Int. Cl.
*H01M 10/04* (2006.01)
*H01M 50/557* (2021.01)
*H01M 50/548* (2021.01)
*H01M 50/566* (2021.01)
*H01M 50/533* (2021.01)
*B23K 101/38* (2006.01)

(52) U.S. Cl.
CPC ....... *H01M 50/533* (2021.01); *H01M 50/548* (2021.01); *H01M 50/557* (2021.01); *H01M 50/566* (2021.01); *B23K 2101/38* (2018.08)

(56) References Cited

U.S. PATENT DOCUMENTS

| | | |
|---|---|---|
| 2013/0052531 A1 | 2/2013 | Yoshitake et al. |
| 2018/0158623 A1 | 6/2018 | Kishi |
| 2019/0217413 A1 | 7/2019 | Yamashita et al. |

FOREIGN PATENT DOCUMENTS

| | | | |
|---|---|---|---|
| JP | 09-330706 A | 12/1997 | |
| JP | 2009-026705 A | 2/2009 | |
| JP | 2011-115814 A | 6/2011 | |
| JP | 2013-065552 A | 4/2013 | |
| JP | 2014179435 A * | 9/2014 | ............ H01L 24/78 |
| JP | 2016107291 A * | 6/2016 | |
| JP | 2018-045975 A | 3/2018 | |
| JP | 2018-195393 A | 12/2018 | |
| JP | WO2019/069659 A1 | 10/2020 | |
| KR | 10-2006-0087419 A | 8/2006 | |
| WO | 2016/208238 A1 | 12/2016 | |
| WO | WO-2018159197 A1 * | 9/2018 | ......... H01M 50/531 |
| WO | WO-2020066240 A1 * | 4/2020 | ......... H01M 50/531 |

OTHER PUBLICATIONS

JP-2016107291-A Murakami machine translation (Year: 2016).*
JPWO2018159197A1 Tsukimori et al., machine translation (Year: 2018).*

* cited by examiner

MANUFACTURING METHOD OF SECONDARY BATTERY AND SECONDARY BATTERY

CROSS REFERENCE TO RELATED APPLICATIONS

The present application claims the priority based on Japanese Patent Application No. 2019-81817 filed on Apr. 23, 2019, the entire contents of which are incorporated in the present specification by reference.

BACKGROUND

1. Technical Field

The present disclosure relates to a manufacturing method of a secondary battery and a secondary battery manufactured by the manufacturing method.

2. Description of the Related Art

In recent years, a lithium ion secondary battery, a nickel metal hydride battery, and other secondary batteries have grown in importance as the power supply to be mounted in a vehicle, or the power supplies of a personal computer and a portable terminal. Particularly, a lithium ion secondary battery is lightweight, and can provide a high energy density, and hence has been preferably used as a high-output power supply to be mounted in a vehicle. As one example of a structure of this kind of secondary battery, mention may be made of a structure in which an electrode body is accommodated in the inside of an exterior body made of a laminate film. In a secondary battery of such a structure, a terminal connecting part constituted of a plurality of stacked layers of collector foils is formed at each opposite side edge part of an electrode body. The terminal connecting part is connected with an electrode terminal. A part of such an electrode terminal is exposed to the outside of the exterior body, and is electrically connected with an external device (such as a vehicle).

Figure 6:
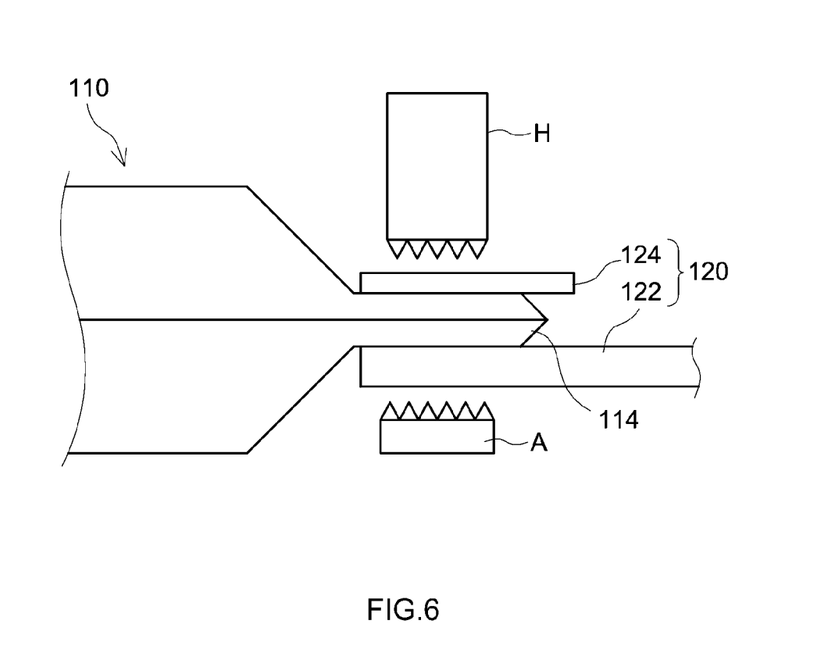
FIG. 6 is a cross sectional view for illustrating a manufacturing method of a conventional secondary battery.

FIG. 6 shows one example of a manufacturing method of a secondary battery of the structure. With this manufacturing method, an electrode terminal 120 formed of a first terminal 122 and a second terminal 124 is used. Then, a terminal connecting part 114 of an electrode body 110 is interposed between the first terminal 122 and the second terminal 124. Then, the terminal connecting part 114, the first terminal 122, and the second terminal 124 are interposed between a horn H and an anvil A, and are pressurized while applying an ultrasonic wave thereon from the horn H. As a result, the electrode body 110 and the electrode terminal 120 are connected with each other. Examples of a connecting method thus using ultrasonic welding are disclosed in Japanese Patent Application Publication No. 2018-45975, Japanese Patent Application Publication No. 2013-65552, and Japanese Patent Application Publication No. 2009-26705.

Figure 7:
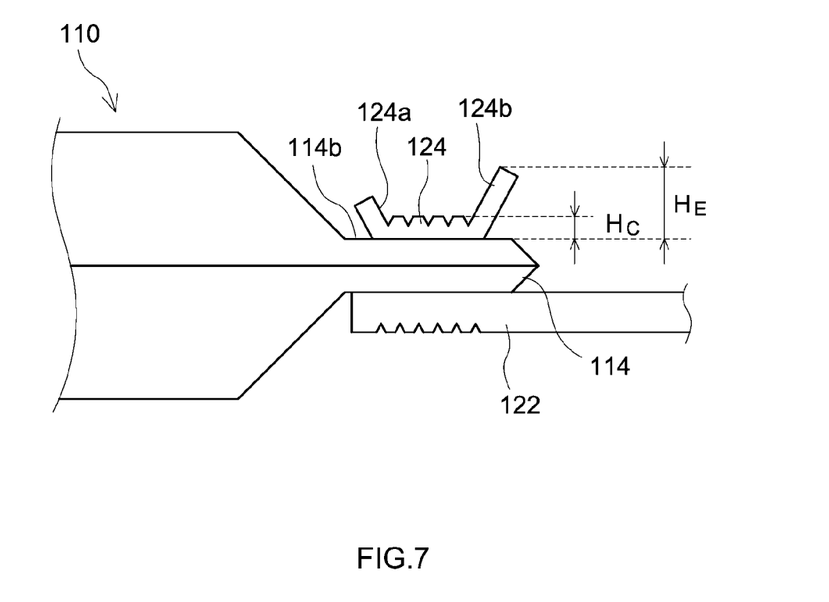
FIG. 7 is a cross sectional view schematically showing a connecting part between an electrode terminal and an electrode body in the conventional secondary battery.

Incidentally, when an electrode body and an electrode terminal are connected with each other using ultrasonic welding, the electrode terminal (particularly, the second terminal) after welding is deformed, which may break the exterior body (laminate film). Specifically, as shown in FIG. 7, by the pressure during ultrasonic welding, the ends 124a and 124b of the second terminal 124 may be deformed so as to rise from the upper surface 114b of the terminal connecting part 114. When such rising deformation is caused, the ends 124a and 124b of the second terminal 124 may come in contact with the exterior body, and may break the exterior body.

One example of the technology of preventing the breakage of the exterior body due to the rising deformation of the electrode terminal is disclosed in WO 2016/208238. With the manufacturing method described in this literature, after a step of subjecting the assembly part of the uncoated part (terminal connecting part) and the electrode terminal to ultrasonic welding, a step of pressing the junction part between the terminal connecting part and the electrode terminal is carried out. This can reform the electrode terminal which has undergone rising deformation into a flat state.

SUMMARY

However, the method described in WO 2016/208238 has various problems. This creates a demand for a technology capable of more properly preventing the breakage of the exterior body due to rising deformation of the electrode terminal. Specifically, when the electrode terminal of a metal member once undergoes rising deformation, spring back that the metal member tries to return to the state before reformation may be caused even if the deformation is reformed in the subsequent pressing step. When the spring back is caused after accommodating the electrode body in the inside of the exterior body, the exterior body may be broken due to the contact with the electrode terminal. Further, with the method described in this literature, a pressing step is required to be carried out after a welding step. This also causes a reduction of the production efficiency and an increase in facility cost due to the increase in number of steps, and other deficiencies.

The present invention was completed in view of such points. It is a main object thereof to provide a technology capable of preventing the breakage of the exterior body due to the rising deformation of the electrode terminal without causing various conventional problems.

A manufacturing method of secondary battery disclosed herein is a manufacturing method of a secondary battery including an electrode body including a terminal connecting part constituted of a plurality of staked layers of collector foils, an exterior body made of a laminate film for accommodating the electrode body, and an electrode terminal to be connected with the terminal connecting part. The electrode terminal of such a secondary battery includes a first terminal that has a plate shape and extends along a width direction such that a first end is connected with a lower surface of the terminal connecting part and a second end is exposed to an outside of the exterior body; and a second terminal that has a plate shape and is to be connected with an upper surface of the terminal connecting part. Then, the manufacturing method disclosed herein includes the following steps (1) to (3) of: (1) bringing the first terminal into contact with the lower surface of the terminal connecting part, and bringing the second terminal into contact with the upper surface of the terminal connecting part; (2) interposing the terminal connecting part, the first terminal, and the second terminal between a horn having a plurality of protrusions and an anvil having a plurality of protrusions such that the anvil comes in contact with the lower surface of the first terminal and the horn comes in contact with an upper surface of the second terminal, and carrying out ultrasonic welding; and (3) accommodating the electrode body to which the first terminal and the second terminal are welded into the exterior body. Then, the manufacturing method herein disclosed is characterized in that a width dimension $W_H$ of the horn is longer than a width dimension $W_2$ of the second terminal, and a width dimension $W_A$ of the anvil is longer than the width dimension $W_2$ of the second terminal.

This can prevent the electrode terminals (the first terminal and the second terminal) after ultrasonic welding from undergoing rising deformation itself. For this reason, with the secondary battery manufactured by the manufacturing method herein disclosed, the electrode terminal does not undergo spring back, which can surely prevent the breakage of the exterior body due to the contact with the electrode terminal. Further, with the manufacturing method herein disclosed, it becomes unnecessary to carry out a step of reforming the deformed electrode terminal (e.g., a pressing step). For this reason, this method can also contribute to the improvement of the production efficiency and the reduction of the facility cost.

Further, in accordance with one preferable aspect of the manufacturing method herein disclosed, each tilted surface of protrusions formed at opposite ends in a width direction of the horn, and each of opposite ends of the upper surface of the second terminal are brought into contact with each other. As a result, the opposite ends of the upper surface of the second terminal after manufacturing are chamfered. This can prevent the surrounding members from being broken by the opposite ends of the upper surface of the second terminal.

Further, in accordance with one preferable aspect of the manufacturing method herein disclosed, a tilt angle $\theta_1$ of each of the protrusions formed at the opposite ends in the width direction of the horn is smaller than a tilt angle $\theta_2$ of a protrusion formed at a central part in the width direction. As a result, even when misalignment is caused between the second terminal and the horn during ultrasonic welding, poor welding due to the misalignment can be prevented from being caused.

Still further, in accordance with one preferable aspect of the manufacturing method herein disclosed, a height dimension $H_1$ of the protrusions formed at the opposite ends in the width direction of the horn is shorter than a height dimension $H_2$ of the protrusion formed at the central part in the width direction. This can weaken the pressure applied on the opposite ends of the second terminal. For this reason, it is possible to prevent the collector foil forming the terminal connecting part from being broken in the vicinity of the second terminal.

Furthermore, in accordance with one preferable aspect of the manufacturing method herein disclosed, a width dimension $W_A$ of the anvil is longer than a width dimension $W_H$ of the horn. This allows the pressure applied to the first terminal from the horn via the second terminal and the terminal connecting part to be properly received. For this reason, it is possible to preferably prevent the first terminal from undergoing rising deformation.

Still further, in accordance with one preferable aspect of the manufacturing method herein disclosed, a thickness $T_2$ of the second terminal is thinner than a thickness $T_1$ of the first terminal. As a result, the ultrasonic wave (oscillation) applied from the horn can be properly transferred to the terminal connecting part, which can achieve preferable junction between the collector foils forming the terminal connecting part. Incidentally, when the thickness $T_2$ of the second terminal is reduced, the second terminal becomes more likely to be deformed. However, with the manufacturing method herein disclosed, even when the thickness $T_2$ of the second terminal is reduced, it is possible to surely prevent the rising deformation of the second terminal.

As another aspect of the present invention, a secondary battery is provided. A secondary battery herein disclosed includes an electrode body including a terminal connecting part constituted of a plurality of staked layers of collector foils, an exterior body made of a laminate film for accommodating the electrode body, and an electrode terminal to be connected with the terminal connecting part. The electrode terminal of such a secondary battery includes a first terminal joined to the lower surface of the terminal connecting part, and partially exposed to an outside of the exterior body, and a second terminal joined to an upper surface of the terminal connecting part. Then, in at least some region in a depth direction of a lower surface of the first terminal, a first welding mark including a plurality of recesses and projections is formed. A width dimension $W_3$ of the first welding mark is longer than a width dimension $W_2$ of the second terminal. Whereas, in at least some region in a depth direction of an upper surface of the second terminal, a second welding mark including a plurality of recesses and projections is formed from a first end to a second end in a width direction of the second terminal. Then, with the secondary battery herein disclosed, a height dimension $H_C$ at a central part in the width direction of the second terminal, and a height dimension $H_E$ at an end in the width direction of the second terminal satisfy a relationship of $H_C \geq H_E$.

The secondary battery having the foregoing configuration is a secondary battery manufactured by the manufacturing method herein disclosed. At the lower surface of the first terminal of the secondary battery, a first welding mark on which the shape of the upper surface of the anvil used in ultrasonic welding has been transferred is formed. Namely, with the secondary battery herein disclosed, a width dimension $W_3$ of the first welding mark is longer than the width dimension $W_2$ of the second terminal. Further, at the upper surface of the second terminal, a second welding mark on which the shape of the lower surface of the horn has been transferred is formed. Namely, with the secondary battery herein disclosed, the second welding mark is formed from a first end to a second end in the width direction of the upper surface of the second terminal. Then, by using the manufacturing method herein disclosed, it is possible to surely prevent the rising deformation of the second terminal. As a result, a flat second terminal in which the height dimension $H_E$ of the end in the width direction does not exceed the height dimension $H_C$ of the central part (i.e., the height dimension $H_C$ of the central part in the width direction of the second terminal, and the height dimension $H_E$ of the end in the width direction of the second terminal satisfy the relationship of $H_C \geq H_E$) is connected with the terminal connecting part. Incidentally, in the present specification, the term "height dimension $H_E$ of the end in the width direction of the second terminal" denotes the height dimension of the end with a larger deformation amount (with a larger height dimension) of the opposite ends in the width direction of the second terminal.

Further, in accordance with one preferable aspect of the secondary battery herein disclosed, a recessed part is formed at each opposite end of the second welding mark. By forming the recessed parts (chamfering) at the opposite ends of the second welding mark (the opposite ends of the upper surface of the second terminal), it is possible to prevent the breakage of the surrounding members by the opposite ends of the upper surface of the second terminal.

Still further, in accordance with one preferable aspect of the secondary battery herein disclosed, a tilt angle $\theta_3$ of the recessed part formed at each opposite end of the second welding mark is smaller than a tilt angle $\theta_4$ of a recessed part formed at the central part in the width direction. As described above, by setting the tilt angle $\theta_1$ of each protrusion at the opposite ends of the horn smaller than the tilt angle $\theta_2$ of a protrusion at the central part in ultrasonic welding, it is possible to prevent the occurrence of misalignment during ultrasonic welding. In the case using such a horn, the second welding mark including the recessed parts having the tilt angles $\theta_3$ and $\theta_4$ as described above is formed.

Further, in accordance with one preferable aspect of the secondary battery herein disclosed, a depth $D_1$ of the recessed part formed at each opposite end of the second welding mark is shallower than a depth $D_2$ of the recessed part formed at the central part in the width direction. As described above, by setting the height dimension $H_1$ of each protrusion at the opposite ends of the horn shorter than the height dimension $H_2$ of the protrusion at the central part in ultrasonic welding, it is possible to prevent the breakage of the terminal connecting part in the vicinity of the opposite ends of the second terminal. In the case using such a horn, a second welding mark having recessed parts with the depths $D_1$ and $D_2$ as described above is formed.

DETAILED DESCRIPTION

Below, a description will be given to a manufacturing method of a lithium ion secondary battery as one example of a manufacturing method of a secondary battery (which will also be referred to as simply a "manufacturing method") of the present invention. Incidentally, the secondary battery manufactured by the manufacturing method herein disclosed is not limited to a lithium ion secondary battery, and may be, for example, a nickel metal hydride battery. Further, matters necessary for executing the present invention, except for matters specifically referred to in the present specification (e.g., a general technology in accordance with construction of a secondary battery of materials, configurations, and the like of an electrode body) can be grasped as design matters of those skilled in the art based on the related art in the present field.

Incidentally, in the following accompanying drawings, the members/portions exerting the same action are given the same reference number and sign, and are described. Further, the dimensional relation (such as length, width, or thickness) in each drawing does not reflect the actual dimensional relation. Then, a reference sign X in each drawing in the present specification denotes the "width direction", a reference sign Y denotes the "depth direction", and a reference sign Z denotes the "height direction". Incidentally, the directions are the direction set for convenience of description, and are not intended to restrict the setting form of the secondary battery.

1. Overall Structure of Secondary Battery

Figure 1:
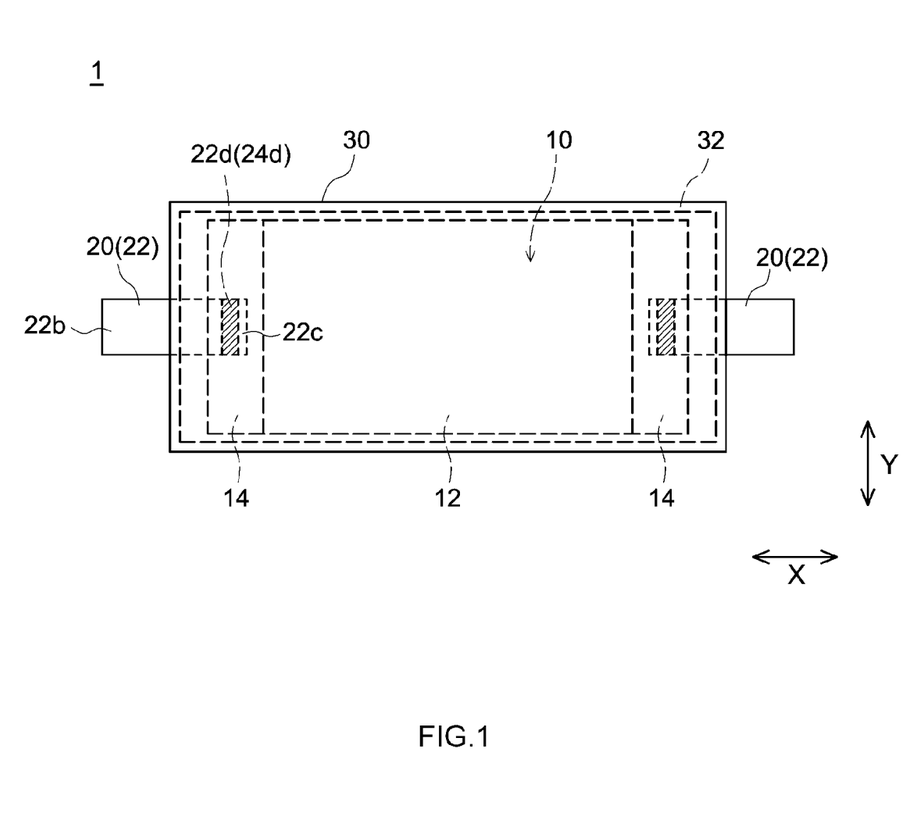
FIG. 1 is a plan view schematically showing an overall structure of a lithium ion secondary battery.

Before describing a manufacturing method in accordance with the present embodiment, first, an overall structure of a secondary battery manufactured by the manufacturing method will be described. FIG. 1 is a plan view schematically showing an overall structure of a lithium ion secondary battery. As shown in FIG. 1, a secondary battery 1 manufactured by a manufacturing method in accordance with the present embodiment has an electrode body 10 having a terminal connecting part 14, an exterior body 30 for accommodating the electrode body 10, and an electrode terminal 20 to be connected with a terminal connecting part 14.

(1) Exterior Body

The exterior body 30 is formed of a laminate film. For the laminate film, those usable for the exterior body of this kind of secondary battery can be used without particular restriction. As shown in FIG. 1, the electrode body 10 is placed between a pair of laminate films, and the outer circumferential edges of the laminate films are welded to form a welded part 32, resulting in the formation of the exterior body 30 for accommodating the electrode body 10 therein.

(2) Electrode Body

Although not described in details, the electrode body 10 has an electrode sheet including a positive electrode and a negative electrode. Such an electrode sheet has collector foil of a foil-shaped metal member, and an electrode mixture material layer coated on the surface of the collector foil. Incidentally, for the materials for the collector foil and the electrode mixture material layer, those usable for this kind of secondary battery can be used without particular restriction, and the materials do not restrict the technology herein disclosed. Accordingly, a detailed description thereon is omitted. Then, in each electrode sheet of the positive electrode and the negative electrode, on one side edge part in the width direction, an uncoated part in which the electrode mixture material layer is not coated and the collector foil is exposed is formed. Then, respective electrode sheets are stacked so that the uncoated part of the positive electrode protrudes from one side edge part, and sot that the uncoated part of the negative electrode protrudes from the other side edge part, thereby forming the electrode body 10. At the central part in the width direction X of the electrode body 10, a core part 12 at which the electrode mixture material layers of respective electrode sheets are stacked one on another is formed. Then, at one side edge part in the width direction X, a terminal connecting part 14 at which a plurality of layers of the uncoated parts (collector foils) of the positive electrode are stacked is formed. At the other side edge part, a terminal connecting part 14 at which a plurality of layers of the uncoated parts (collector foils) of the negative electrode are stacked is formed.

Incidentally, it is essential only that the electrode body 10 includes the terminal connecting part 14 formed therein. There is no particular restriction on the particular structure. For example, the electrode body 10 may be a wound electrode body obtained by winding long electrode sheets. Alternatively, the electrode body 10 may be a lamination type electrode body obtained by stacking a plurality of rectangular electrode sheets. Incidentally, a secondary battery 1 manufactured by the manufacturing method in accordance with the present embodiment may be a nonaqueous electrolyte secondary battery, or may be an all-solid-state battery. For example, in the case of a nonaqueous electrolyte secondary battery, an electrode body in which an insulating separator is inserted between electrode sheets is used, and, a nonaqueous electrolyte is accommodated in the inside of the exterior body 30. On the other hand, in the case of an all-solid-state battery, an electrode body in which a solid electrolyte layer is inserted between electrode sheets is used. Incidentally, also for other members than the electrode sheets, those usable for this kind of secondary battery can be used without particular restriction.

(3) Electrode Terminal

The electrode terminal 20 is connected with the terminal connecting part 14 of the electrode body 10. Although particularly described later, the electrode terminal 20 has a first terminal 22 to be connected with a lower surface 14a of the terminal connecting part 14, and a second terminal 24 to be connected with an upper surface 14b of the terminal connecting part 14 (see FIG. 4). The first terminal 22 is a conductive plate-shaped member extending along the width direction X. As shown in FIG. 1, a first end 22c of the first terminal 22 is connected with the terminal connecting part 14 of the electrode body 10, and a second end 22b is exposed to the outside of the exterior body 30. On the other hand, the second terminal 24 is a plate-shaped member covering a part of the upper surface 14b of the terminal connecting part 14, and is accommodated in the inside of the exterior body.

As shown in FIG. 1, with the secondary battery 1 manufactured by the manufacturing method in accordance with the present embodiment, the electrode terminal 20 is provided at each of the opposite ends in the width direction X. One of the electrode terminals 20 is a positive electrode terminal connected to the terminal connecting part 14 on the positive electrode side, and the other is a negative electrode terminal connected with the terminal connecting part 14 on the negative electrode side. Incidentally, the positions at which the positive electrode terminal and the negative electrode terminal are respectively provided are not limited to the structure shown in FIG. 1. For example, even to a secondary battery in which both of the positive electrode terminal and the negative electrode terminal are provided at one end in the width direction, the technology herein disclosed can be applied.

2. Manufacturing Method of Secondary Battery

Figure 2:
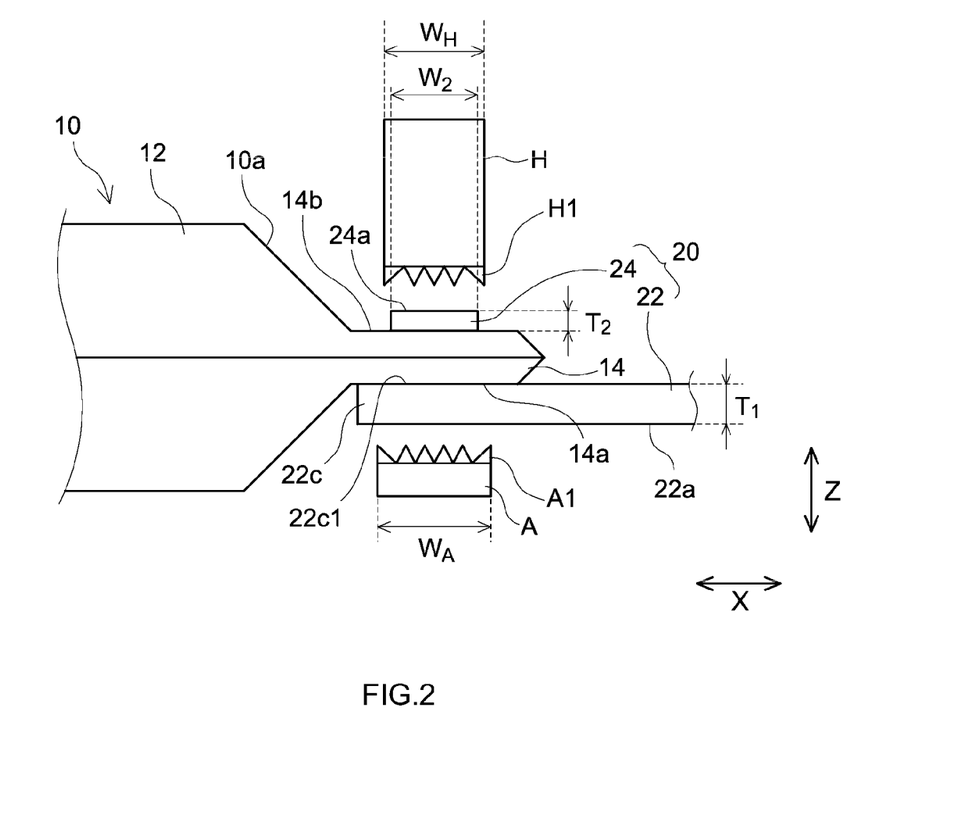
FIG. 2 is a cross sectional view for illustrating a manufacturing method of a secondary battery in accordance with one embodiment of the present invention.

Then, a manufacturing method in accordance with the present embodiment will be described. FIG. 2 is a cross sectional view for illustrating a manufacturing method of a secondary battery in accordance with the present embodiment. The manufacturing method in accordance with the present embodiment includes (1) a mounting step, (2) a welding step, and (3) an accommodating step. Below, respective steps will be described. Incidentally, for the members (the electrode body 10 and the electrode terminal 20) for use in the manufacturing method in accordance with the present embodiment, those previously manufactured may be prepared, or those manufactured in the previous step of the mounting step may be used. Incidentally, the electrode body 10 and the electrode terminal 20 can be manufactured according to a conventionally known method.

(1) Mounting Step

With the manufacturing method in accordance with the present embodiment, first, a mounting step of mounting the electrode terminal 20 to the electrode body 10 is carried out. Specifically, as shown in FIG. 2, the upper surface 22c1 of the first end 22c of the first terminal 22 is brought into contact with the lower surface 14a of the terminal connecting part 14 of the electrode body 10, and the second terminal 24 is brought into contact with the upper surface 14b of the terminal connecting part 14. As a result, the terminal connecting part 14 is interposed between the first terminal 22 and the second terminal 24.

At this step, the thickness $T_2$ of the second terminal 24 for use in the present embodiment is preferably smaller than the thickness $T_1$ of the first terminal 22. As a result, the ultrasonic wave applied from the horn H in a welding step described later can be transferred to the terminal connecting part 14 with efficiency. For this reason, it is possible to favorably achieve welding between a plurality of layers of collector foils forming the terminal connecting part 14. On the other hand, when the thickness $T_2$ of the second terminal 24 is reduced, the second terminal 24 tends to become more likely to be deformed. However, with the manufacturing method in accordance with the present embodiment, even when the thickness $T_2$ of the second terminal 24 is reduced, it is possible to prevent the rising deformation of the second terminal 24 with reliability. For this reason, only the effect resulting from the reduction of the thickness of the second terminal 24 can be enjoyed.

Incidentally, from the viewpoint of more favorably achieving welding between the collector foils of the terminal connecting part 14, the thickness $T_2$ of the second terminal 24 is preferably 0.7 mm or less, more preferably 0.5 mm or less, and further preferably 0.3 mm or less. Still further, from the viewpoint of ensuring the connection strength between the second terminal 24 and the terminal connecting part 14, the lower limit of the thickness $T_2$ of the second terminal 24 is preferably 0.01 mm or more, more preferably 0.05 mm or more, and further preferably 0.1 mm or more.

On the other hand, from the viewpoint of preventing the rising deformation of the first terminal 22 with reliability, the thickness $T_1$ of the first terminal 22 is preferably 0.5 mm or more, more preferably 0.7 mm or more, and further preferably 1 mm or more. Incidentally, the upper limit of the thickness $T_1$ of the first terminal 22 has no particular restriction, and may be 3 mm or less, may be 2 mm or less, and may be 1.5 mm or less.

(2) Welding Step

In a welding step, using an ultrasonic welding device having a horn H and an anvil A, the electrode terminal 20 is welded to the terminal connecting part 14 of the electrode body 10. Specifically, as shown in FIG. 2, the anvil A having a plurality of protrusion A1 is brought into contact with the lower surface 22a of the first terminal 22, and the horn H having a plurality of protrusions H1 is brought into contact with the upper surface 24a of the second terminal 24. As a result, the terminal connecting part 14, the first terminal 22, and the second terminal 24 are interposed between the horn H and the anvil A. Then, while further moving the horn H downward, and applying a pressure to each member, an ultrasonic wave is applied from the horn H, thereby oscillating each member. As a result, the first terminal 22 and the second terminal 24 are welded to the terminal connecting part 14, and the collector foils forming the terminal connecting part 14 are welded.

Herein, with the manufacturing method in accordance with the present embodiment, the width dimension of each member is adjusted so that the width dimension $W_H$ of the horn H is longer than the width dimension $W_2$ of the second terminal 24. As a result, the entire region from a first end to a second end in the width direction X of the second terminal 24 is pressed by the horn H. For this reason, it is possible to prevent the rising deformation from being caused at the end of the second terminal 24 with reliability.

Incidentally, the width dimension $W_H$ of the horn H has no particular restriction so long as the width dimension $W_H$ is longer than the width dimension $W_2$ of the second terminal 24. Namely, when the ratio ($W_H/W_2$) between the width dimension $W_H$ of the horn H and the width dimension $W_2$ of the second terminal 24 exceeds 1, the rising deformation of the second terminal 24 can be prevented. However, from the viewpoint of carrying out reliable welding even when misalignment is caused between the horn H and the second terminal 24 during welding, the $W_H/W_2$ is preferably 1.05 or more, more preferably 1.1 or more, further preferably 1.15 or more, and particularly preferably 1.2 or more. Incidentally, the upper limit of the $W_H/W_2$ has no particular restriction, and may be, for example, 1.5 or less.

Further, with the manufacturing method in accordance with the present embodiment, it is also possible to prevent the breakage of the exterior body due to rising deformation of the first terminal 22 on the lower side of the terminal connecting part 14. Specifically, in the present embodiment, the width dimension $W_A$ of the anvil A supporting the first terminal 22 from the lower surface side is longer than the width dimension $W_2$ of the second terminal 24 on the upper side. As a result, the pressure applied to the first terminal 22 via the second terminal 24 can be dispersed. For this reason, it is possible to prevent such large rising deformation as to break the exterior body from being caused on the first end 22c of the first terminal 22.

Incidentally, from the viewpoint of more preferably preventing the rising deformation of the first end 22c of the first terminal 22, the width dimension $W_A$ of the anvil A is preferably longer than the width dimension $W_H$ of the horn H. Further, from the viewpoint of further preferably preventing the deformation of the first end 22c of the first terminal 22, the ratio ($W_A/W_2$) between the width dimension $W_A$ of the anvil A and the width dimension $W_2$ of the second terminal 24 is preferably 1.25 or more, more preferably 1.3 or more, further preferably 1.4 or more, and particularly preferably 1.5 or more. On the other hand, the upper limit of the $W_A/W_2$ has no particular restriction, and may be 20 or less, may be 10 or less, may be 5 or less, and may be 2.5 or less. Still further, from the viewpoint of preventing the deformation of the first end 22c of the first terminal 22 with reliability, the width dimension $W_A$ and the layout position of the anvil A are particularly preferably adjusted so that the anvil A covers the first end 22c of the first terminal 22.

Incidentally, as the conditions for ultrasonic welding in the present step, conventionally known conditions for use in connection between an electrode body and an electrode terminal can be applied without particular restriction. For example, the frequency of the ultrasonic wave applied from the horn H can be set within the range of 20 kHz to 40 kHz. Further, the output can be set within the range of 400 W to 4000 W. Still further, the pressure from the horn H can be set within the range of 10 kgf/cm² to 1000 kgf/cm². The welding time can be set at 0.1 second to 2 second.

(3) Accommodating Step

Then, in an accommodating step, the electrode body 10 to which the first terminal 22 and the second terminal 24 are connected is accommodated in the inside of the exterior body 30. For example, as shown in FIG. 1, the electrode body 10 is interposed between two laminate films so that the second end 22b of the second terminal 24 is exposed. Thus, the outer circumferential edges of the laminate films are welded. This can manufacture the secondary battery 1 in which the electrode body 10 is accommodated in the inside of the exterior body 30.

As described up to this point, with the manufacturing method in accordance with the present embodiment, it is possible to prevent the electrode terminal 20 (the first terminal 22 and the second terminal 24) from undergoing rising deformation in ultrasonic welding itself. For this reason, as distinct from the case where the deformed electrode terminal is reformed by a pressing step, or the like, it is possible to prevent breakage of the exterior body 30 due to the occurrence of deformation (spring back) in the electrode terminal 20 after accommodation in the inside of the exterior body 30. Further, with the manufacturing method in accordance with the present embodiment, it becomes unnecessary to carry out the step of reforming the deformation of such as the pressing step. This can also contribute to the improvement of the production efficiency, and the reduction of the facility cost.

(4) Shape of Horn

Figure 3:
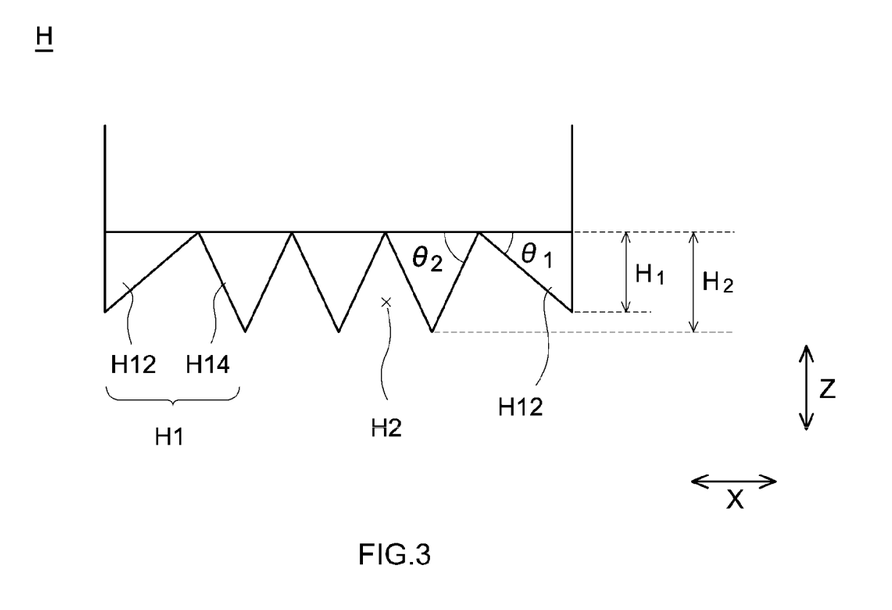
FIG. 3 is a cross sectional view showing the lower part of a horn in FIG. 2 on an enlarged scale.

Incidentally, the horn H of the ultrasonic welding device is preferably appropriately changed in structure so as to be able to preferably carry out ultrasonic welding. For example, a plurality of protrusions H1 are formed at the lower surface of the horn H in order to prevent the occurrence of misalignment due to oscillation during welding. By changing the shape of each protrusion H1 of such a horn H, it is possible to more preferably carry out ultrasonic welding. Below, the shape of the protrusion H1 of such a horn H will be described. FIG. 3 is a cross sectional view showing the lower part of the horn H in FIG. 2 on an enlarged scale.

As shown in FIG. 3, the lower surface of the horn H has an uneven structure including protrusions H1 and grooved parts H2 formed alternately therein. At this step, preferably, not the grooved parts H2 but the protrusions H1 are formed at the opposite ends in the width direction X of the lower surface of the horn H. When the horn H including the protrusions H1 thus formed at the opposite ends thereof is used, the recessed parts 24b1 corresponding to the protrusions H12 at the opposite ends of the horn H are formed at the opposite ends of the upper surface of the second terminal 24 after welding (see FIG. 5). As a result, the opposite ends of the upper surface of the second terminal 24 are subjected to chamfering. This can suppress the breakage of the members (such as the electrode body 10 and the exterior body 30) around the second terminal 24.

Further, when the protrusions H12 are respectively formed at the opposite ends of the horn H as in the aspect, the shape of the protrusion H1 is preferably varied between the protrusions H12 at the opposite ends and the protrusions H14 at the central part.

For example, as shown in FIG. 3, the tilt angle $\theta_1$ of each protrusion H12 at the opposite ends is preferably smaller than the tilt angle $\theta_2$ of each protrusion H14 at the central part. By thus making the tilt of each protrusion H12 at the opposite ends gentle, it is possible to prevent the occurrence of poor welding due to misalignment even when the misalignment is caused during welding. More specifically, the tilt angle $\theta_2$ of the protrusion H14 at the central part is set generally at 45° to 80° (preferably 50° to 70°, for example, 60°). In contrast, the tilt angle $\theta_1$ of each protrusion H12 at the opposite ends is preferably 20° to 40°, and more preferably 25° to 35°.

Further, the height dimension $H_1$ of each protrusion H12 at the opposite ends is preferably shorter than the height dimension $H_2$ of each protrusion H14 at the central part. This can prevent the breakage of the terminal connecting part 14 in the vicinity of the opposite ends of the second terminal 24. Specifically, in the welding step, the second terminal 24 is pressed onto the terminal connecting part 14 while being oscillated. For this reason, the collector foil forming the terminal connecting part 14 may be broken in the vicinity of the opposite ends of the second terminal 24. In contrast, as described above, the height dimension $H_1$ of each protrusion H12 at the opposite ends is shortened, and the pressure applied from the horn H to the opposite ends of the second terminal 24 is weakened. As a result, it is possible to suppress the breakage of the terminal connecting part 14 (collector foil) in the vicinity of the opposite ends of the second terminal 24. Incidentally, from the viewpoint of preferably preventing the breakage of the terminal connecting part 14, the ratio ($H_1/H_2$) between the height dimension $H_1$ of each protrusion H12 at the opposite ends and the height dimension $H_2$ of each protrusion H14 at the central part is preferably 0.1 or more, more preferably 0.3 or more, and further preferably 0.4 or more. On the other hand, from the viewpoint of allowing prevention of the occurrence of poor welding due to misalignment even when the misalignment between the horn H and the second terminal 24 is caused, the upper limit of the $H_1/H_2$ is set preferably 0.9 or less, more preferably 0.8 or less, and further preferably 0.7 or less.

3. Secondary Battery after Manufacturing

Figure 4:
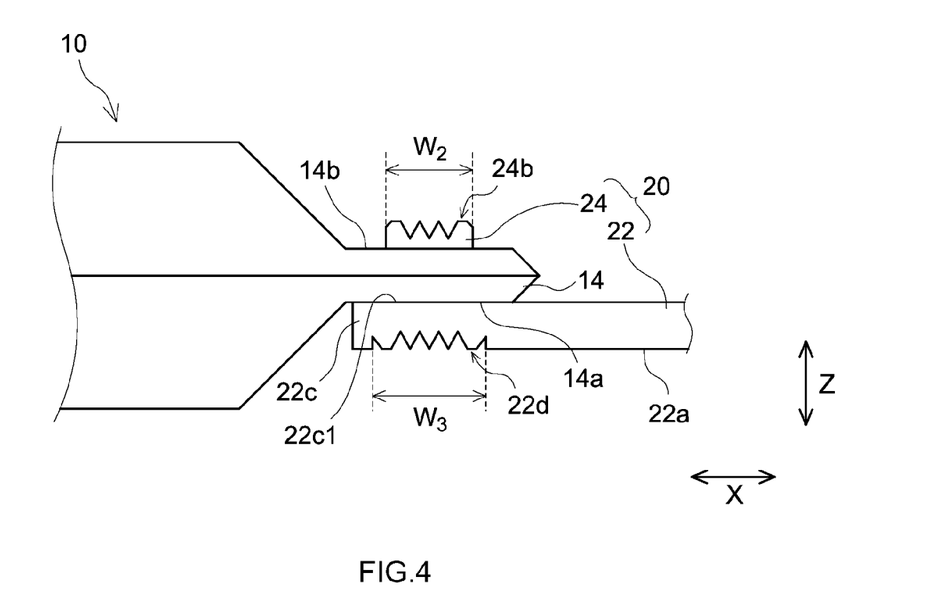
FIG. 4 is a cross sectional view schematically showing a connecting part between an electrode terminal and an electrode body in the secondary battery in accordance with one embodiment of the present invention.

Then, the secondary battery manufactured by the manufacturing method in accordance with the present embodiment will be described. FIG. 4 is a cross sectional view schematically showing the connecting part between the electrode terminal and the electrode body in the secondary battery in accordance with the present embodiment. As shown in FIG. 4, the secondary battery manufactured by the manufacturing method in accordance with the present embodiment has various structural features in the connecting part between the electrode terminal 20 and the electrode body 10.

First, in the secondary battery, a first welding mark 22d having a plurality of recesses and projections is formed at the lower surface 22a of the first terminal 22. The first welding mark 22d is obtained by transferring the protrusions A1 of the anvil A (see FIG. 2) used in the welding step thereto. As described above, with the manufacturing method in accordance with the present embodiment, the dimensional relationship is adjusted so that the width dimension $W_A$ of the anvil A is longer than the width dimension $W_2$ of the second terminal 24. For this reason, as shown in FIG. 4, for the secondary battery after manufacturing, the width dimension $W_3$ of the first welding mark 22d formed at the lower surface 22a of the first terminal 22 is longer than the width dimension $W_2$ of the second terminal 24.

Then, with the secondary battery in accordance with the present embodiment, a second welding mark 24b having a plurality of recesses and projections is formed at the upper surface of the second terminal 24. The second welding mark 24b is obtained by transferring the protrusions $H_1$ of the horn H (see FIG. 2) used in the welding step thereto. With the manufacturing method in accordance with the present embodiment, the dimensional relationship is adjusted so that the width dimension $W_H$ of the horn H is longer than the width dimension $W_2$ of the second terminal 24. For this reason, as shown in FIG. 4, in the secondary battery after manufacturing, the second welding mark 24b is formed from a first end to a second end in the width direction X of the second terminal 24 (in the entire region in the width direction X of the second terminal 24).

Incidentally, as shown in FIG. 1, in the secondary battery 1 in accordance with the present embodiment, the welding marks (the first welding mark 22d and the second welding mark 24b) are formed in the entire region in the depth direction Y of the electrode terminal 20. As a result, it is possible to sufficiently ensure the strength and the electric conductivity of the connecting part between the electrode terminal 20 and the electrode body 10. However, when the electrode terminal 20 and the electrode body 10 can be properly connected with each other, the formation region of the welding marks in the depth direction Y has no particular restriction. Namely, it is essential only that the first welding mark 22d and the second welding mark 24b are formed in at least some region in the depth direction Y.

Then, as shown in FIG. 4, with the manufacturing method in accordance with the present embodiment, it is possible to prevent the rising deformation of the second terminal 24 with reliability. For this reason, with the secondary battery after manufacturing, the deformation-free and flat second terminal 24 is connected with the terminal connecting part 14. Specifically, when a conventional manufacturing method (see FIG. 6) is used, as shown in FIG. 7, large rising deformation is caused at the ends 124a and 124b of the second terminal 124. In this case, the height dimension $H_E$ of the ends 124a and 124b of the second terminal 124 is larger than the height dimension $H_C$ of the central part of the second terminal 124 ($H_C < H_E$). In contrast, with the secondary battery manufactured in accordance with the present embodiment, the rising deformation of the second terminal 24 can be prevented with reliability. Accordingly, the flat second terminal 24 in which the height dimension $H_E$ of the end in the width direction does not exceed the height dimension $H_C$ of the central part (i.e., the height dimension $H_C$ at the central part in the width direction of the second terminal 24, and the height dimension $H_E$ of the end in the width direction of the second terminal 24 satisfy the relationship of $H_C \geq H_E$) is connected with the terminal connecting part 14 (see FIG. 5). For this reason, it is possible to prevent the breakage of the exterior body by the end of the second terminal 24.

Figure 5:
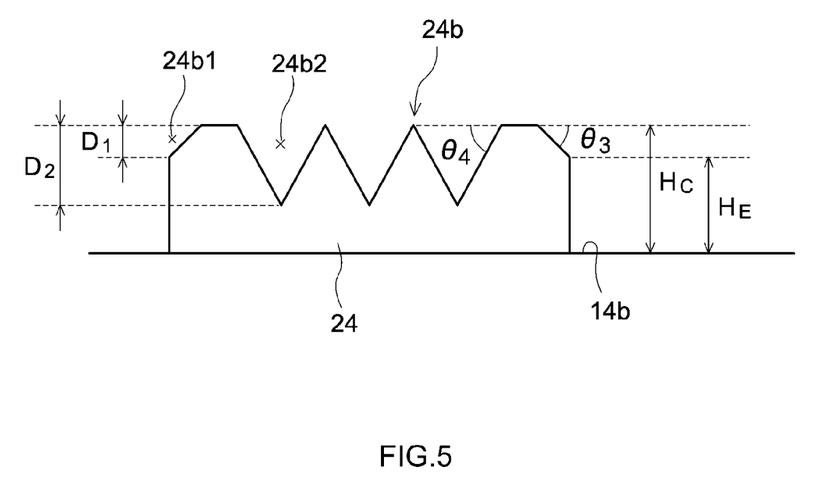
FIG. 5 is a cross sectional view showing a second terminal and a terminal connecting part in FIG. 4 on an enlarged scale.

Incidentally, as described above, for the horn H for use in the welding step, such a structure as to allow ultrasonic welding to be preferably carried out is preferably adopted (see FIG. 3). In this case, the second welding mark 24b in a shape in accordance with the shape of the horn H is formed at the upper surface of the second terminal 24. FIG. 5 is a cross sectional view showing the second terminal and the terminal connecting part in FIG. 4 on an enlarged scale.

For example, when the horn H including the protrusions H1 respectively formed at the opposite ends in the width direction X as in FIG. 3 is used, the recessed parts 24b1 are formed at the opposite ends of the second terminal 24 after manufacturing. Thus, the opposite ends of the upper surface of the second terminal 24 are subjected to chamfering. As a result, the members around the second terminal 24 can be prevented from being broken. Further, the tilt angle $\theta_1$ of each protrusion H12 at the opposite ends is made smaller than the tilt angle $\theta_2$ of each protrusion H14 at the central part as in FIG. 3. As a result, the tilt angle $\theta_3$ of each recessed part 24b1 at the opposite ends of the second welding mark 24b is smaller than the tilt angle $\theta_4$ of each recessed part 24b2 at the central part (see FIG. 5). Further, when the height dimension $H_1$ of each protrusion H12 at the opposite ends is set shorter than the height dimension $H_2$ of each protrusion H14 at the central part as in FIG. 3, the depth $D_1$ of each recessed part 24b1 at the opposite ends of the second welding mark 24b is shallower than the depth $D_2$ of the recessed part 24b2 at the central part (see FIG. 5).

Up to this point, the specific examples of the present invention were described in details. However, these are merely illustrative, and do not restrict the appended claims.

The technology disclosed in the appended claims includes various modifications and changes of the specific examples exemplified up to this point.

What is claimed is:

1. A manufacturing method of a secondary battery comprising an electrode body including a terminal connecting part constituted of a plurality of stacked layers of collector foils, an exterior body made of a laminate film for accommodating the electrode body, and an electrode terminal to be connected with the terminal connecting part, the electrode terminal including a first terminal that has a plate shape and extends along a width direction such that a first end is connected with a lower surface of the terminal connecting part and a second end is exposed to an outside of the exterior body, and a second terminal that has a plate shape and is to be connected with an upper surface of the terminal connecting part, the method comprising the steps (1) to (3) of:

(1) bringing the first terminal into contact with the lower surface of the terminal connecting part, and bringing the second terminal into contact with the upper surface of the terminal connecting part;

(2) interposing the terminal connecting part, the first terminal, and the second terminal between a horn having a plurality of protrusions and an anvil having a plurality of protrusions such that the anvil comes in contact with the lower surface of the first terminal and the horn comes in contact with an upper surface of the second terminal, and carrying out ultrasonic welding; and (3) accommodating the electrode body to which the first terminal and the second terminal are welded into the exterior body, wherein a width dimension $W_H$ of the horn is longer than a width dimension $W_2$ of the second terminal, and a width dimension $W_A$ of the anvil is longer than the width dimension $W_2$ of the second terminal, wherein an entire region from a first end to a second end in the width direction of the second terminal is pressed by the horn, and wherein each tilted surface of protrusions formed at opposite ends in a width direction of the horn and each of opposite ends of the upper surface of the second terminal are brought into contact with each other.

2. The manufacturing method of a secondary battery according to claim 1, wherein a tilt angle $\theta_1$ of each of the protrusions formed at the opposite ends in the width direction of the horn is smaller than a tilt angle $\theta_2$ of a protrusion formed at a central part in the width direction.

3. The manufacturing method of a secondary battery according to claim 1, wherein a height dimension $H_1$ of the protrusions formed at the opposite ends in the width direction of the horn is shorter than a height dimension $H_2$ of the protrusion formed at the central part in the width direction.

4. The manufacturing method of a secondary battery according to claim 1, wherein the width dimension $W_A$ of the anvil is longer than the width dimension $W_H$ of the horn.

5. The manufacturing method of a secondary battery according to claim 1, wherein a thickness $T_2$ of the second terminal is smaller than a thickness $T_1$ of the first terminal.

* * * * *